United States Patent

Goldberg

[15] 3,685,030

[45] Aug. 15, 1972

[54] LIGHT BEAM PROJECTION ASSEMBLY FOR A WORD ORGANIZED OPTIC MEMORY

[72] Inventor: Norman Goldberg, Dresher, Pa. 19025

[73] Assignee: Sperry Rand Corporation, New York, N.Y.

[22] Filed: Feb. 11, 1970

[21] Appl. No.: 10,534

[52] U.S. Cl..........340/174 YC, 340/174 TF, 350/150

[51] Int. Cl........G11c 5/02, G11c 11/14, G11c 11/42

[58] Field of Search..340/174 TF, 174 YC; 350/150, 350/151

[56] References Cited

UNITED STATES PATENTS

| | | |
|---|---|---|
| 3,475,737 | 10/1969 | Kump et al.............340/174 K |
| 3,515,887 | 6/1970 | Rosenburg et al.........350/150 |
| 3,526,881 | 9/1970 | Judge et al..........340/174 YC |

*Primary Examiner*—Bernard Konick

*Assistant Examiner*—Steven B. Pokotilow

*Attorney*—Charles C. English, Leonard Zalman and William E. Cleaver

[57] ABSTRACT

A light beam projection assembly comprising a light beam deflection apparatus and other apparatus which expands the cross-sectional area of the polarized light beam received from the deflection apparatus such that components of the expanded light beam can be focused simultaneously onto corresponding regions of a plurality of adjacent, coplanar, light responsive target wafers. When the target wafers are of a ferrimagnetic material having a magnetic compensation temperature, components of the expanded light beam are focused onto the corresponding regions of the wafers either to write in the regions by raising the temperature of the regions above the magnetic compensation temperature of the material or to read the information stored in the regions by observing the polarization rotation of the components of the light beam due to the presence of information stored at the regions.

12 Claims, 1 Drawing Figure

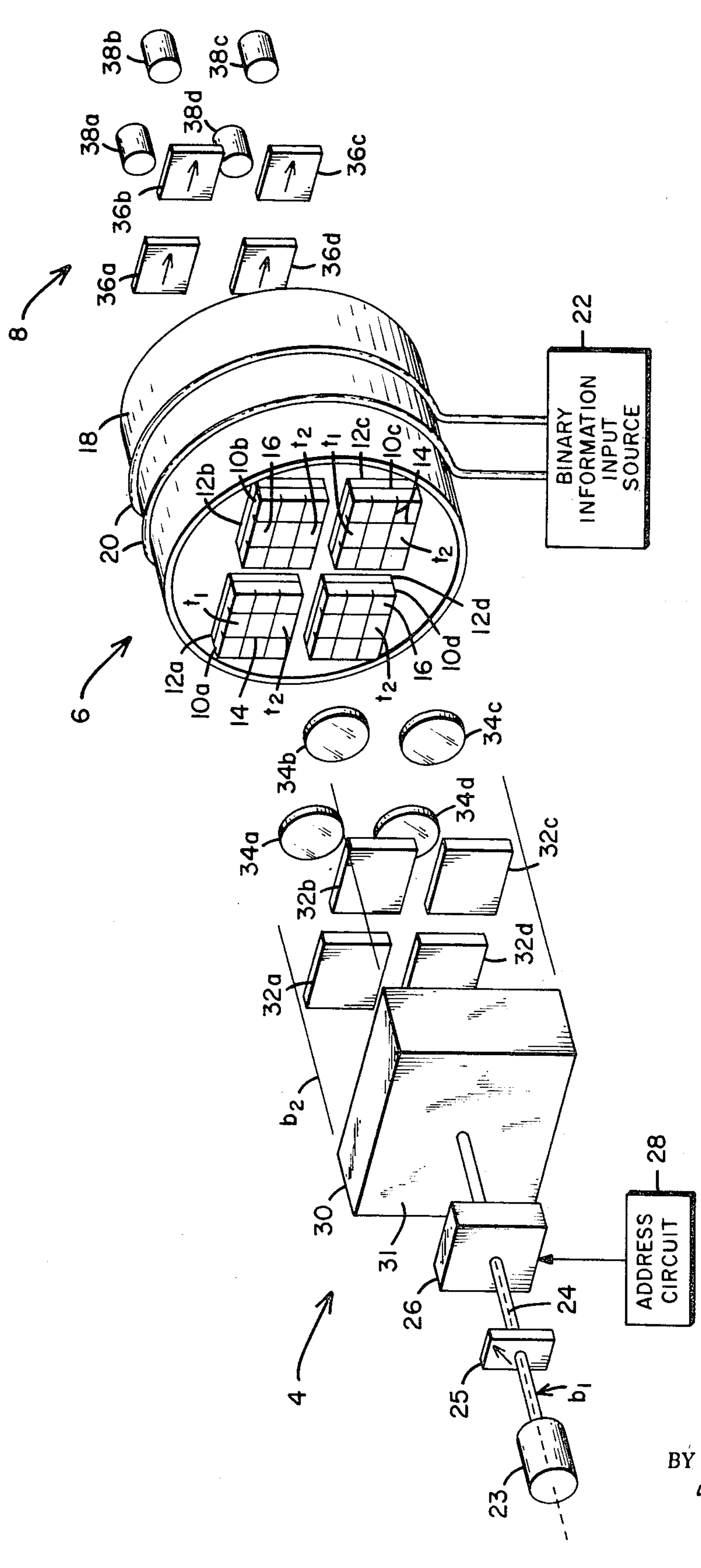
INVENTOR.
NORMAN GOLDBERG
BY Leonard Zalman
ATTORNEY

LIGHT BEAM PROJECTION ASSEMBLY FOR A WORD ORGANIZED OPTIC MEMORY

Recently, a parallel input/output magneto-optic information storage system was proposed which, purportedly, provides increased information storage capacity and increased information storage/retrieval speed. In addition to first and second groups of substantially identical target wafers, each divided into a plurality of elemental regions, with the first and second groups of wafers disposed in mutually orthogonal planes, the proposed system includes a light beam projection assembly having both a light deflecting apparatus and a deflecting-light splitting apparatus. The light deflecting-light splitting apparatus includes a plurality (numbering one less than the number of wafers) of parallel, partially transmitting mirrors arranged such that components of a storage/retrieval light beam are projected onto corresponding regions of the wafers.

A disadvantage of the light beam projection assembly used in the proposed parallel input/output magneto-optic information storage system is that it is asymmetrical. One factor contributing to the asymmetry is that the components of the storage/retrieval light beam must travel different distances to impinge upon corresponding regions of the wafers.

Another factor contributing to the asymmetry is that all but two of the components of the storage/retrieval light beam are reflected by at least two of the partially transmitting mirrors, each of which has a transmissivity different from that of any other of the mirrors. Due to manufacturing tolerances, the mirrors may not transmit the desired percentage of incident light and, as a result, the components of the storage/retrieval light beam impinging upon corresponding regions of the wafers may have different intensities.

It is an object of the present invention to provide an improved light beam projection assembly.

Another object of the present invention is to provide an improved parallel light beam projection assembly having only one light beam deflecting apparatus.

Another object of the present invention is to provide an improved light beam projection assembly for a parallel input/output magneto-optic information storage system.

Another object of the present invention is to provide a parallel input/output magneto-optic information storage system in which each component of a storage/retrieval light beam travels approximately the same distance and has approximately the same intensity.

In accordance with the present invention there is provided a light beam projection assembly including a light beam cross-sectional area expanding apparatus which increases the cross-sectional area of a previously deflected light beam incident thereon such that components of the light beam can be focused simultaneously, following amplitude modulation if such modulation is desired, onto corresponding regions of a plurality of coplanar, light responsive target wafers. Since the direction of propagation of the output light beam of the light beam cross-sectional area expanding apparatus is a direct function of the direction of propagation of the light beam incident thereupon, proper deflection of the incident light beam by the light beam deflecting apparatus of the projection assembly ensures proper impingement of the components of the expanded light beam upon the corresponding regions of the target wafers.

The invention may be understood fully from the following detailed description with reference to the accompanying drawing in which the sole FIGURE is a partially perspective and partially block diagram of a preferred embodiment of a system utilizing the light beam projection assembly of the invention.

Although the light beam projection assembly of the invention can be used as a component of a wide variety of light responsive systems, it is particularly useful as a component of a parallel input/output magneto-optic information storage system. Accordingly, the invention is described in the environment of a parallel input/output magneto-optic information storage system.

Referring now to the drawing, there is shown a parallel input/output magneto-optic information storage system which includes the novel light beam projection assembly generally indicated as 4, a memory apparatus generally indicated as 6 which stores information in response to the output of projection assembly 4, and an information detection apparatus generally indicated as 8 which is responsive to both the output of assembly 4 and the information stored by apparatus 6.

Apparatus 6 includes a two by two array of coplanar ferri-magnetic target wafers 10*a*, 10*b*, 10*c*, and 10*d* which are attached in a conventional manner to optically transparent sheets 12a, 12*b*, 12*c*, and 12*d*, respectively, of a material having good thermal conductivity, for example, sapphire. Wafers 10 can be any optically transparent ferrimagnetic material which subjects a light beam passing therethrough to a relatively large polarization rotation. Rare earth iron garnets having a magnetic compensation temperature below room temperature (70° F), such as gadolinium iron garnet (57° F), terbium iron garnet (−17° F), dysprosium iron garnet (−63° F), holmium iron garnet (−121 ° F), and erbium iron garnet (−308° F), are suitable ferrimagnetic materials for wafers 10. Aluminum oxide can be added to each of the aforementioned rare earth iron garnets to raise its magnetic compensation temperature if it is desired to maintain it at that temperature by a regulated oven rather than by a regulated refrigeration unit. Typically, wafers 10 are about 0.001 inch thick and sheets 12 are about 0.002 inch thick. Sheets 12 need not be the same size as wafers 10.

Grooves 14 divide the surface of each of the wafers 10 into a plurality of discrete storage regions 16. As a representative example, each wafer 10 can be a square measuring 1 centimeter on a side with each region 16 being a square measuring 10 microns on a side. These representative sizes provide 1 million storage regions per wafer. Wafers 10 might define discrete storage regions without grooves provided that the material of wafers 10 has a small stable spot size.

Cooling apparatus shown pictorially as cylinder 18 maintains wafers 10 at about their magnetic compensation temperature. Apparatus 18 may consist of a refrigeration unit and cooling coils for cooling a suitable refrigerant, means pumping the refrigerant through the refrigeration unit and the cooling coils, and a thermostat for regulating the flow of refrigerant. If the magnetic compensation temperature of the material of wafers 10 is above room temperature, the magnetic compensation temperature is maintained by an oven having, for example, non-inductive heating coils.

Magnetic field coil 20 produces, in response to a signal from binary information input source 22, a uniform magnetic field through wafers 10. The signal from source 22 has either a first polarity corresponding to a first binary value or a second polarity corresponding to a second binary value. Thus, the signal from source 22 produces through wafers 10 a magnetic field oriented in either a first direction perpendicular to the grooved surfaces of wafers 10 (corresponding to the first binary value) or a second direction (corresponding to the second binary value) opposite to the first direction.

Light beam projection assembly 4 includes a light beam source 23, for example, a laser, which projects a high intensity light beam $b_1$ in axial direction 24. A polarizer 25 linearly polarizes light beam $b_1$ to provide a reference direction of polarization for information detection apparatus 8. This reference direction is illustrated in the drawing (by the arrow within polarizer 25) as extending at 45° to the horizontal direction.

The linearly polarized light beam is incident upon a conventional light beam deflection apparatus 26 which, in response to a signal from address circuit 28, deflects the polarized light beam from axial direction 24 such that when the signal from circuit 28 is other than zero, the light beam impinges upon surface 31 of light beam cross-sectional area expanding apparatus 30 at an oblique angle. Apparatus 26 may comprise a plurality of serially arranged electro-optic crystals (not shown) for example, potassium dihydrogenphosphate crystals interleaved with birefringent crystals (not shown), for example, Wollaston prisms.

Light beam cross-sectional area expanding apparatus 30 may comprise a lens system having, for example, a pair of biconvex lenses separated by a distance equal to the sum of their focal lengths and disposed coaxially with beam deflection apparatus 26. The lens nearest to apparatus 26 has a smaller focal length than the other lens. Due to the spacing of the pair of lenses, the deflected light beam exits the lens system with substantially parallel rays. Alternatively, the lens system may comprise a biconvex lens and a biconcave lens separated by a distance equal to the difference in their focal lengths. In the latter lens system, the biconcave lens is closest to apparatus 26.

The cross-sectional area expanded light beam $b_2$ produced by apparatus 30 is incident simultaneously upon a two by two array of conventional, coplanar light amplitude modulators 32*a*, 32*b*, 32*c*, and 32*d*. Modulators 32 are normally in a partially transmissive state but may be switched to either a fully transmissive state or a non-transmissive state. Amplitude modulators 32*a*, 32*b*, 32*c*, and 32*d* are followed respectively by a two by two array of substantially identical, coplanar focusing lenses 34*a*, 34*b*, 34*c*, and 34*d*, which are separated from targets 10 by a distance approximately equal to their focal length. Wafers 10*a*, 10*b*, 10*c*, and 10*d* are coaxial with both modulators 32*a*, 32*b*, 32*c*, and 32*d*, respectively, and lenses 34*a*, 34*b*, 34*c*, and 34*d*, respectively.

Information detection apparatus 8 consists of a two by two array of coplanar polarization analyzers 36*a*, 36*b*, 36*c*, and 36*d* and a two by two array of coplanar photodetectors 38*a*, 38*b*, 38*c*, 38*d*, all of conventional construction. Wafers 10*a*, 10*b*, 10*c*, and 10*d*, are coaxial with both polarization analyzers 36*a*, 36*b*, 36*c*, and 36*d*, respectively, and photodetectors 38*a*, 38*b*, 38*c*, and 38*d*, respectively. Analyzers 36 attentuate completely light energy of one direction of polarization, exemplified in the drawing (by the arrows within analyzers 36) as the horizontal direction, and transmit in a varying degree light energy incident thereon of other directions of polarization. Each of the photodetectors 38 produces an electrical signal having a magnitude directly proportional to the intensity of the light beam incident thereon. Due to analyzers 36, each of these electrical signals can have either of two values (corresponding to the two possible magnetic field storage directions of storage regions 16) and hence the output signals of the storage system are suitable for utilization by a conventional digital computer.

To store information corresponding to a selected binary value simultaneously at selected regions of some of wafers 10, for example, at regions $t_1$ on the vertical axis of wafers 10*a* and 10*c*, coil 20 is energized by a signal from source 22 having a polarity corresponding to the selected binary value, modulators 32*a* and 32*c* are switched to their fully transmissive state, modulators 32*b* and 32*d* are switched to their non-transmissive state, and the light beam from source 23 is directed by apparatus 26 in the appropriate direction. More specifically, apparatus 26 deflects the light beam upward from the axial direction by a precalibrated amount such that light beam components of the expanded light beam $b_2$ incident on lenses 34*a* and 34*c* are focused upon regions $t_1$ of wafers 10*a* and 10*c*. The light beam components increase the temperature of regions $t_1$ to above the magnetic compensation temperature. As a result of the increase in temperature, which generally need not be more than 10° F., regions $t_1$ are magnetized in the direction of the field produced by coil 20. Since regions $t_1$ remain magnetized even when these regions are cooled to about the magnetic compensation temperature, a magnetic bit of information corresponding to the selected binary value is stored at each of the regions $t_1$. Following cooling of regions $t_1$ to about the magnetic compensation temperature, modulators 32*b* and 32*d* are switched to the fully transmissive state (modulators 32*a* and 32*c* having been switched to their non-transmissive state) and the polarity of the signal from source 22 is reversed without changing the direction of light beam $b_2$ such that regions of wafers 10*b* and 10*d* are heated simultaneously to magnetize these regions in the direction of the magnetic field produced by this signal from source 22. If it is desired to store information simultaneously on all of the wafers 10, all of the modulators 32 are switched to their fully transmissive state at one time.

For read-out of stored information simultaneously from a selected region of each of the wafers 10, for example, from regions $t_2$ on the vertical axis of wafers 10, the polarized light beam $b_1$ is directed downward at the appropriate angle by deflection apparatus 26, then expanded by apparatus 30, and then modulated to a low intensity by modulators 32 operating in their partially transmissive state. When a magnetic bit of binary information is stored at regions $t_2$, the direction of polarization of each of the components of the expanded light beam is rotated as a result of the Faraday effect. The direction of polarization of each component of the expanded light beam is rotated in one sense or the other sense depending upon whether the region on which the component is incident contains a magnetic bit of information corresponding to information of one binary value or the other binary value. This polarization rotation is translated into a binary code by polarization analyzers 36 and photodetectors 38.

From the foregoing, it is apparent that light beam projection assembly 4 provides simultaneous storage of several bits of binary information and large storage capacity with a single light beam deflection apparatus and a single light beam source which are the most expensive parts of a magneto-optic memory system. In addition, the projection assembly is symmetrical. That is, each component of the storage/retrieval light beam travels about the same distance from the light beam area expanding apparatus 30 to its associated wafer 10 and has about the same intensity due to the absence in assembly 4 of partially silvered mirrors.

Although the invention has been described with reference to a particular embodiment thereof, various modifications can be made without departing from the scope of the invention. For example, the light beam of projection assembly 4 need not be expanded to the desired cross-sectional area by a single light beam cross-sectional area expanding apparatus but may be expanded to the desired area by several serially arranged light beam cross-sectional area expanding apparatuses. In addition, the number of light beam components need not be limited to four projected in a two by two array but may be a larger or lesser number depending upon the number of light responsive target wafers used with the projection assembly. Furthermore, modulator 32, lenses 34, wafers 10, analyzers 36 and photodetectors 38 need not be coplanar.

If it is desired to store simultaneously information corresponding to both binary values on different wafers 10, each wafer 10 would have its own field producing coil 20. In this embodiment, each coil 20 could be coupled to its own binary information input source.

I claim:

1. A magneto-optic information storage system comprising:

a group of storage targets of a ferrimagnetic material having a magnetic compensation temperature, each of said wafers having a plurality of discrete storage areas, and light beam projection means disposed opposite one side of said targets comprising in the order mentioned a light beam source which projects a light beam along a desired path, a signal-controlled light beam deflection apparatus disposed in said path for deflecting said light beam from said path, and first means disposed to receive said deflected light beam for expanding the cross-sectional area of said light beam incident thereon and for projecting a spot of light simultaneously onto a storage area of at least some of said targets.

2. A system according to claim 1 wherein said projection means further includes a group of focusing lenses disposed between said first means and said group of storage targets.

3. A system according to claim 2 wherein said projection means further includes a group of light amplitude modulators disposed between said group of lenses and said first means.

4. A system according to claim 3 further including second means for stabilizing the ambient temperature of said targets at about said magnetic compensation temperature, and third means external to said targets for applying at selected times through at least some of said targets a magnetic field having a binary information responsive polarity.

5. A system according to claim 4 wherein a group of polarizers and a group of photodetectors are disposed serially opposite another side of said targets.

6. A system according to claim 5 wherein said group of targets are substantially coplanar.

7. A system according to claim 6 wherein the number of each of said group of amplitude modulators, said group of focusing lenses, said group of polarizers, and said group of photodetectors is equal to the number of said group of targets.

8. A system according to claim 7 wherein each one of said group of modulators, said group of lenses, said group of polarizers, and said group of photodetectors is coaxial with a different one of said group of targets.

9. A system according to claim 8 wherein at least some of said modulators are fully transmissive at said selected times.

10. A system according to claim 9 wherein each of said targets has a sheet of a light-transparent, heat-conducting material attached to said other side of said target.

11. A system according to claim 10 wherein said projection means further includes a polarizer disposed between said light beam source and said light beam deflection apparatus.

12. A system according to claim 11 wherein said ferrimagnetic material is a rare earth iron garnet.

* * * * *